UNITED STATES PATENT OFFICE 2,117,731

AZODYESTUFFS

Theodor Kollmann, Leverkusen, and Eugen Glietenberg, Leverkusen-I. G.-Werk, Germany, assignors to General Aniline Works, Inc., New York, N. Y., a corporation of Delaware No Drawing. Application November 11, 1936, Serial No. 110,278. In Germany December 18, 1935

13 Claims. (Cl. 8—6)

The present invention relates to water insoluble azo dyestuffs and to printing preparations suitable for the manufacture of the said dyestuffs by a printing process, more particularly our invention relates to water insoluble azo dyestuffs which may be represented by the general formula:

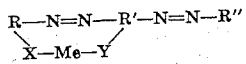

In the said formula R stands for an aromatic radical which may bear further azo groups, for example for the radical of the benzene series, of the naphthalene series, of the diphenyl series and the like, R' stands for a radical of the benzene series, capable of coupling twice, which is substituted in a position meta to Y by an amino or a hydroxy group, by the hydroxy group, however, only when Y stands for NH, R'' stands for the radical of a diazotized aromatic amine of the kind generally used in the manufacture of ice colors, X stands for an oxygen atom or the group COO, Y stands for an oxygen atom or the group NH, Me stands for a metallic atom, capable of yielding azo dyestuff complex compounds and wherein the bridge X—Me—Y is attached to the nuclei in positions ortho to the azo bridge, it being self understood that groups inducing solubility in water such as the sulfonic acid group and the carboxylic acid group, are excluded as substituents.

The process of manufacture of the dyestuffs according to the invention is by coupling, especially on the fiber, metal complex compounds of the azo dyestuffs from meta-aminophenol, meta-phenylenediamine or the substitution products thereof, capable of coupling twice, and ortho-hydroxy- or ortho-carboxydiazo compounds, the azo dyestuffs containing no further solubilizing groups, with diazo compounds suitable for the manufacture of ice colors. The process may be effected in the manner generally used in the manufacture of ice colors by impregnating the fiber with the azo dyestuffs containing metal referred to above and further developing the dyeing with suitable diazo compounds.

A particular method of effecting the process is by bringing the said coupling component on the fiber together with an arylnitrosamine suitable for the manufacture of ice colors (compare U. S. P. 1,915,734) or a suitable aryldiazo-amino- or -imino compound soluble in water or an alkaline medium, as obtainable by the condensation of diazo compounds with primary aliphatic or aromatic, secondary aliphatic aromatic or heterocyclic bases or cyanamide or cyanamide carboxylic acid (compare U. S. Patents 1,858,623, 1,874,524, 1,867,088, 1,871,850, 1,879,424, 1,882,560, 1,882,562, 1,979,327, 1,982,681), and by developing the dyestuff in the customary manner, e. g. by hanging, steaming or treating with dilute acids or steam containing an acid (compare U. S. Patents 1,880,522, 1,882,556, 1,893,991, 2,035,518). In this manner in general brown shades of good fastness properties are obtained.

According to a further feature of the invention for producing the new water insoluble azo dyestuffs by a printing process preparations consisting of the above-named azo dyestuffs and arylnitrosamines or aryldiazoamino- or -imino compounds, soluble in water or an alkaline medium, have proved particularly suited. (Compare U. S. Patents 1,882,561, 1,915,734).

The metal containing ortho-hydroxyazo dyestuffs used as starting materials can also be obtained from ortho-halogen amines or ortho-alkoxy amines as diazotization components with replacement of the halogen or splitting up of the alkoxy groups.

The invention is illustrated by the following examples:

Example 1

A cotton tissue is printed with a printing color, containing in 1000 grams:

28 grams of the diazoimino compound from diazotized 4-chloro-2-anisidine and sarcosine, 32 grams of the copper complex compound of the monoazo dyestuff from 4-chloro-2-diazophenol and meta-aminophenol coupled in an acetic acid medium, 30 grams of aqueous caustic soda lye 38° Be., 50 grams of glycol mono ethyl ether, 500 grams of a neutral starch tragacanth thickener, the remainder being water, dried, steamed for 5 minutes in steam containing acetic acid and formic acid, rinsed, soaped, again rinsed and dried. A very full, deep brown of good fastness properties is obtained.

The dyestuff corresponds to the following formula:

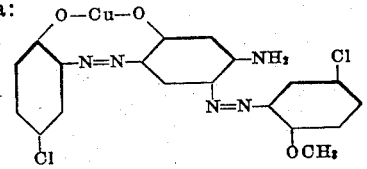

Instead of coupling the meta-aminophenol dyestuff in an acid medium also an alkaline medium can be used.

Example 2

A cotton tissue is printed with a printing color containing in 1000 grams:

28 grams of the diazoimino compound from diazotized 4-chloro-2-anisidine and sarcosine,
31 grams of the copper complex compound of the monoazodyestuff from 4-chlorodiazophenol and meta-phenylene diamine,
50 grams of glycolmonoethylether,
500 grams of a neutral starch tragacanth thickener, the remainder being water, and developed as described in Example 1. A reddish brown is thus obtained.

The dyestuff corresponds to the following formula:

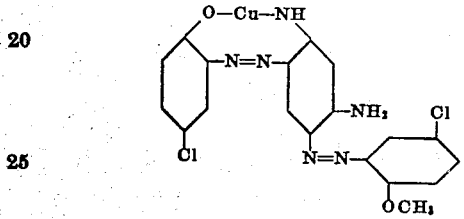

Example 3

A cotton tissue is printed with a printing color containing in 1000 grams:

28 grams of the diazoimino compound from diazotized 4-chloro-2-anisidine and sarcosine,
42 grams of the copper complex compound of the monoazodyestuff from 4-chloro-2-diazophenol and 4'-methyl-3-hydroxydiphenylamine,
38 grams of aqueous caustic soda lye 38° Bé.,
500 grams of a neutral starch tragacanth thickener, the remainder being water, and developed as described in Example 1. A deep brown is obtained.

The dyestuff corresponds to the following formula:

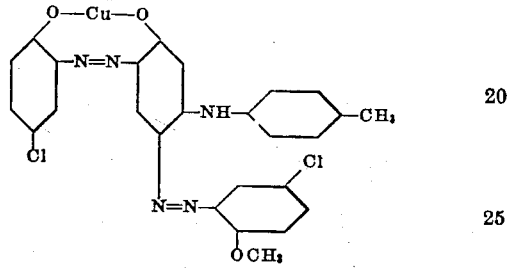

In the following table there are given further combinations prepared in accordance with the invention.

| Coupling component | Diazotization component | Shade |
|---|---|---|
| (Cu-complex azo, Cl, N(CH$_3$)$_2$) | (OCH$_3$, Cl, NH$_2$) | Full reddish brown |
| (Cu-complex azo, Cl, N(C$_2$H$_5$)$_2$) | (OCH$_3$, Cl, NH$_2$) | Full reddish brown |
| (Cu-NH complex azo, Cl, N(CH$_3$)$_2$) | (OCH$_3$, Cl, NH$_2$) | Middle brown |
| (Cu-NH complex azo, Cl, N(C$_2$H$_5$)$_2$) | (OCH$_3$, Cl, NH$_2$) | Middle brown |
| (Cu-NH complex azo, Cl, N(CH$_3$)(CH$_3$)) | (OCH$_3$, Cl, NH$_2$) | Middle brown |
| (Cu-O complex azo, Cl, NH$_2$) | (OCH$_3$, NH$_2$, OCH$_3$) | Middle brown |
| (Cu-O complex azo, Cl, NH$_2$) | (CH$_3$—C$_6$H$_4$—NH$_2$) | Middle brown |
| (Cu-O complex azo, Cl, NH$_2$) | (C$_6$H$_5$—CO—NH—, OC$_2$H$_5$, NH$_2$, OC$_2$H$_5$) | Full black brown |

| Coupling component | Diazotization component | Shade |
|---|---|---|
| | | Middle brown |
| | | Middle brown |
| | | Middle brown |
| | | Black brown |
| | | Middle brown |
| | | Middle brown |
| | | Middle brown |

We claim:

1. Water insoluble azo dyestuffs of the general formula:

$$R—N=N—R'—N=N—R''$$
$$\diagdown X—Me—Y \diagup$$

wherein R stands for an aromatic radical, R' stands for a radical of the benzene series capable of coupling twice, which is substituted in a position meta to Y by a member of the group consisting of an amino and hydroxy group, however, by the hydroxy group only when Y stands for NH, R'' stands for the radical of a diazotized aromatic amine generally used in the manufacture of ice colors, R, R' and R'' being free from water solubilizing groups, X stands for a member selected from the group consisting of an oxygen atom and the group COO, Y stands for a member selected from the group consisting of an oxygen atom and the group NH Me stands for a metallic atom capable of yielding azo dyestuff complex compounds, and wherein the bridge X—Me—Y is attached to the nuclei in positions ortho to the azo bridge, yielding when produced on the fiber in general brown shades of good fastness properties.

2. Water insoluble azo dyestuffs of the general formula:

$$R—N=N—R'—N=N—R''$$
$$\diagdown X—Cu—Y \diagup$$

wherein R stands for an aromatic radical, R' stands for a radical of the benzene series capable of coupling twice, which is substituted in a position meta to Y by a member of the group consisting of an amino and hydroxy group, however, by the hydroxy group only when Y stands for NH, R'' stands for the radical of a diazotized aromatic amine generally used in the manufacture of ice colors R, R' and R'' being free from water solubilizing groups, X stands for a member selected from the group consisting of an oxygen atom and the group COO, Y stands for a member selected from the group consisting of an oxygen atom and the group NH, yielding when produced on the fiber in general brown shades of good fastness properties.

3. Water insoluble azo dyestuffs of the general formula:

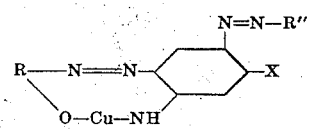

wherein R and R'' stand for benzene radicals being free from water solubilizing groups, X stands for a substituent selected from the group consisting of the amino group and the hydroxy group, and wherein the bridge O—Cu—NH is attached to the nuclei in positions ortho to the azo bridge, yielding when produced on the fiber in general brown shades of good fastness properties.

4. The water insoluble azo dyestuff of the formula:

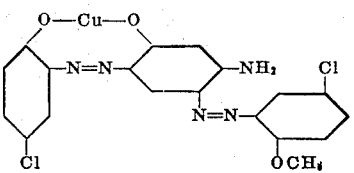

yielding when produced on the fiber a reddish brown.

5. The water insoluble azo dyestuff of the formula:

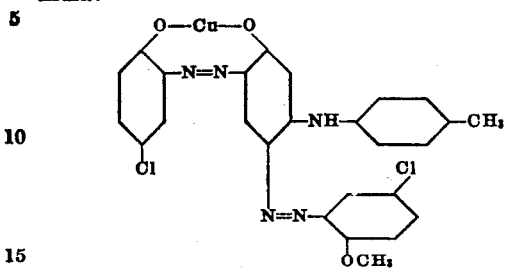

yielding when produced on the fiber a deep brown.

6. Fibers dyed with a dyestuff as claimed in claim 1.

7. Fibers dyed with a dyestuff as claimed in claim 2.

8. Fibers dyed with a dyestuff as claimed in claim 3.

9. Fibers dyed with a dyestuff as claimed in claim 4.

10. Fibers dyed with a dyestuff as claimed in claim 5.

11. Printing preparations containing as essential ingredients a compound of the general formula:

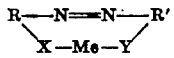

wherein R stands for an aromatic radical, R' stands for a radical of the benzene series capable of coupling twice which is substituted in a position meta to Y by a member of the group consisting of the amino and hydroxy groups, however, by the hydroxy group only when Y stands for NH, R and R' being free from water-solubilizing groups, X stands for a member selected from the group consisting of an oxygen atom and the group COO, Y stands for a member selected from the group consisting of an oxygen atom and the group NH, Me stands for a metallic atom capable of yielding azo dyestuff complex compounds, and wherein the bridge X—Me—Y is attached to the nuclei in positions ortho to the azo bridge, and a compound selected from the group consisting of nitrosamines, diazoamino- and diazoimino compounds derived from aromatic amines generally used in the manufacture of ice colors.

12. Printing preparations containing as essential ingredients a compound of the general formula:

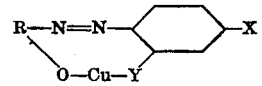

wherein R stands for a radical of the benzene series which is free from water-solubilizing groups, Y stands for a member selected from the group consisting of an oxygen atom and the group NH, X stands for a member of the group consisting of the amino group and the hydroxy group, however, for the hydroxy group only when Y stands for the group NH, and wherein the bridge O—Cu—Y is attached to the nuclei in positions ortho to the azo bridge, and a compound selected from the group consisting of nitrosamines, diazoamino- and diazoimino compounds derived from aromatic amines generally used in the manufacture of ice colors.

13. Printing preparations containing as essential ingredients a compound of the general formula:

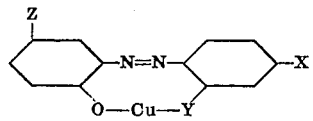

wherein Z stands for a member selected from the group consisting of hydrogen, halogen, the nitro group and an alkyl group, Y stands for a member of the group consisting of an oxygen atom and the group NH and X stands for a member of the group consisting of the amino group and the hydroxy group, however, for the hydroxy group only when Y stands for the group NH, and a compound selected from the group consisting of nitrosamines, diazoamino- and diazoimino compounds derived from an aromatic amine suitable for the manufacture of ice colors.

THEODOR KOLLMANN.
EUGEN GLIETENBERG.